US012632480B2

(12) United States Patent
Dar et al.

(10) Patent No.: US 12,632,480 B2
(45) Date of Patent: May 19, 2026

(54) SYSTEM AND METHOD FOR ENHANCING GENERATIVE ARTIFICIAL INTELLIGENCE (AI) MODEL-BASED MATCHING OF QUERIES AND CONTENTS

(71) Applicant: Dell Products L.P., Round Rock, TX (US)

(72) Inventors: Shaul Dar, Petach Tikva (IL); Ramakanth Kanagovi, Hyderabad (IN); Guhesh Swaminathan, Chennai (IN); Rajan Kumar, Nawada (IN); Ophir Jehoshua Buchman, Ra'anana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/680,398

(22) Filed: May 31, 2024

(65) Prior Publication Data

US 2025/0371051 A1     Dec. 4, 2025

(51) Int. Cl.
G06F 16/3332 (2025.01)
G06F 11/34 (2006.01)
G06F 16/383 (2019.01)

(52) U.S. Cl.
CPC ...... G06F 16/3334 (2019.01); G06F 11/3409 (2013.01); G06F 16/383 (2019.01)

(58) Field of Classification Search
None
See application file for complete search history.

(56) References Cited

U.S. PATENT DOCUMENTS

| | | | | |
|---|---|---|---|---|
| 6,507,829 | B1 * | 1/2003 | Richards | G06F 40/216 |
| | | | | 706/45 |
| 12,039,263 | B1 * | 7/2024 | Mondlock | G06F 40/20 |
| 12,079,570 | B1 * | 9/2024 | Mondlock | G06F 40/20 |
| 2023/0031152 | A1 * | 2/2023 | Bhaskaran | G06F 16/24578 |
| 2024/0330589 | A1 * | 10/2024 | Kotaru | G06F 40/205 |
| 2024/0362497 | A1 * | 10/2024 | Grenader | G06F 16/22 |

* cited by examiner

*Primary Examiner* — Thu N Nguyen
(74) *Attorney, Agent, or Firm* — Brian J. Colandreo; Heath M. Sargeant; Holland & Knight LLP

(57)      ABSTRACT

A method, computer program product, and computing system for generating a plurality of chunks for a plurality of text portions of a document. A plurality of chunk embeddings are generated from the plurality of chunks. A query is processed using a generative artificial intelligence (AI) model. A query embedding is generated from the query. A plurality of candidate chunk embeddings are identified from the plurality of chunk embeddings based upon, at least in part, a chunk size and a chunk similarity score associated with each chunk and a performance metric associated with the query. A prompt is generated using the query embedding and the plurality of candidate chunk embeddings. The prompt is provided to the generative AI model.

14 Claims, 7 Drawing Sheets

10

10

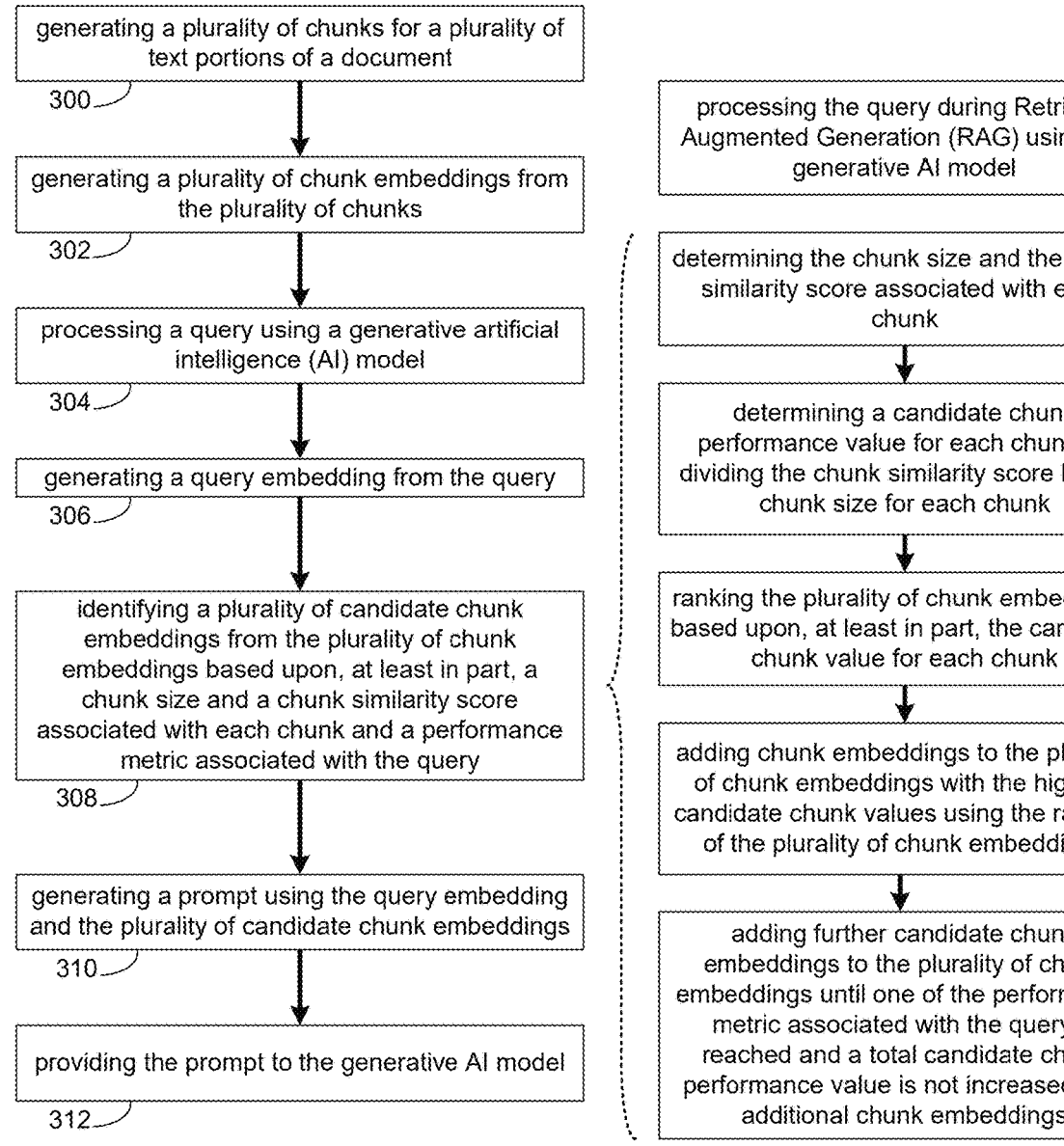

generating a plurality of chunks for a plurality of text portions of a document

300 generating a plurality of chunk embeddings from the plurality of chunks

302 processing a query using a generative artificial intelligence (AI) model

304 generating a query embedding from the query

306 identifying a plurality of candidate chunk embeddings from the plurality of chunk embeddings based upon, at least in part, a chunk size and a chunk similarity score associated with each chunk and a performance metric associated with the query

308 generating a prompt using the query embedding and the plurality of candidate chunk embeddings

310 providing the prompt to the generative AI model

312 processing the query during Retrieval Augmented Generation (RAG) using the generative AI model

314 determining the chunk size and the chunk similarity score associated with each chunk

316 determining a candidate chunk performance value for each chunk by dividing the chunk similarity score by the chunk size for each chunk

318 ranking the plurality of chunk embeddings based upon, at least in part, the candidate chunk value for each chunk

320 adding chunk embeddings to the plurality of chunk embeddings with the highest candidate chunk values using the ranking of the plurality of chunk embeddings

322 adding further candidate chunk embeddings to the plurality of chunk embeddings until one of the performance metric associated with the query is reached and a total candidate chunk performance value is not increased with additional chunk embeddings

Figure 4:
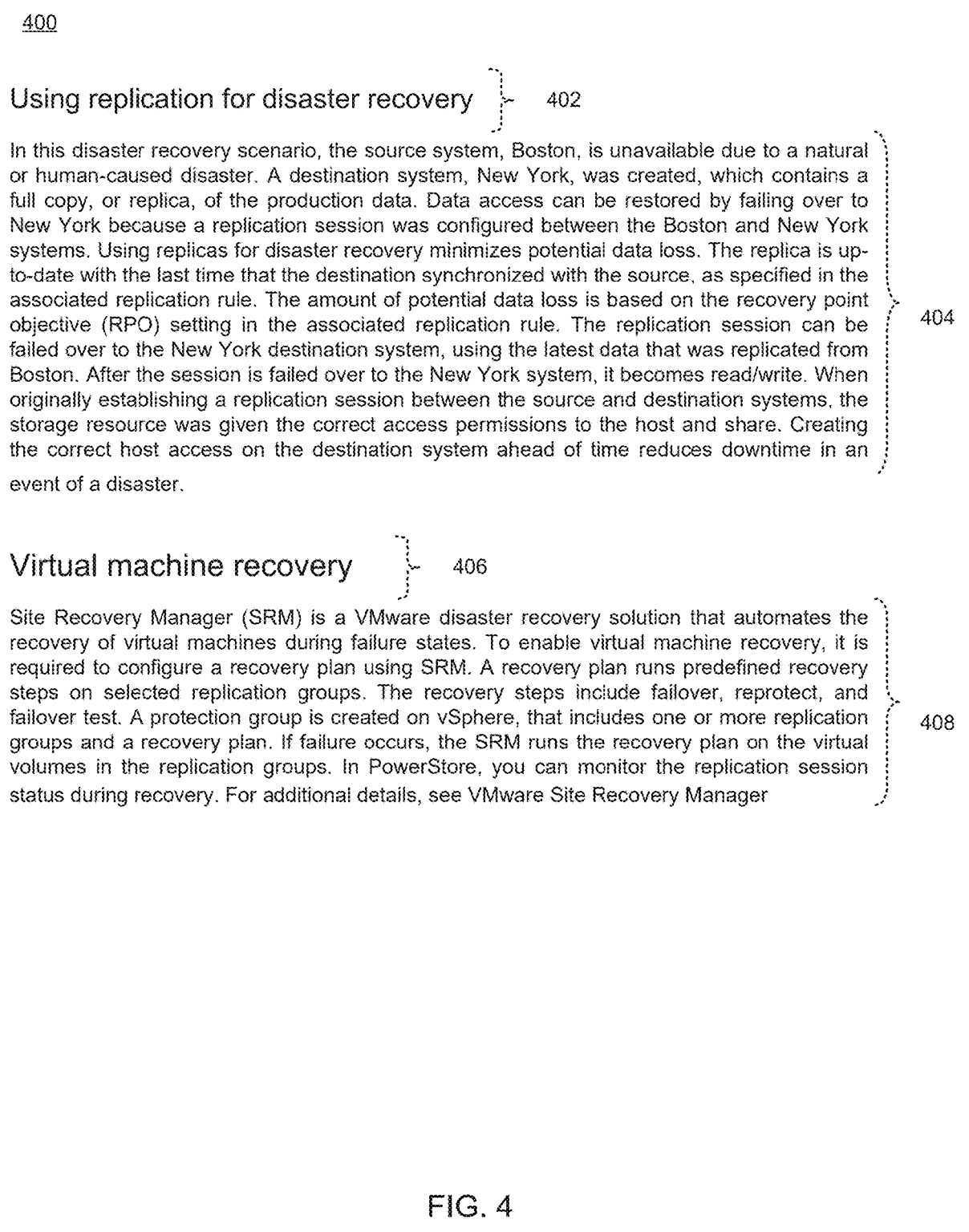

Using replication for disaster recovery ⟩~ 402

In this disaster recovery scenario, the source system, Boston, is unavailable due to a natural
or human-caused disaster. A destination system, New York, was created, which contains a
full copy, or replica, of the production data. Data access can be restored by failing over to
New York because a replication session was configured between the Boston and New York
systems. Using replicas for disaster recovery minimizes potential data loss. The replica is up-
to-date with the last time that the destination synchronized with the source, as specified in the
associated replication rule. The amount of potential data loss is based on the recovery point
objective (RPO) setting in the associated replication rule. The replication session can be
failed over to the New York destination system, using the latest data that was replicated from
Boston. After the session is failed over to the New York system, it becomes read/write. When
originally establishing a replication session between the source and destination systems, the
storage resource was given the correct access permissions to the host and share. Creating
the correct host access on the destination system ahead of time reduces downtime in an
event of a disaster.

404

Virtual machine recovery ⟩~ 406

Site Recovery Manager (SRM) is a VMware disaster recovery solution that automates the
recovery of virtual machines during failure states. To enable virtual machine recovery, it is
required to configure a recovery plan using SRM. A recovery plan runs predefined recovery
steps on selected replication groups. The recovery steps include failover, reprotect, and
failover test. A protection group is created on vSphere, that includes one or more replication
groups and a recovery plan. If failure occurs, the SRM runs the recovery plan on the virtual
volumes in the replication groups. In PowerStore, you can monitor the replication session
status during recovery. For additional details, see VMware Site Recovery Manager

SYSTEM AND METHOD FOR ENHANCING GENERATIVE ARTIFICIAL INTELLIGENCE (AI) MODEL-BASED MATCHING OF QUERIES AND CONTENTS

BACKGROUND

Generative artificial intelligence (AI) models, such as Large Language Model (LLMs)s have recently proven to be a better alternative to traditional search engines, helping users find pieces of information they are looking for, and able to provide more concise and relevant answers, albeit with a risk that the answers may be irrelevant or incorrect.

In some instances, the query that a user types is given as input to the LLM, along an appropriate context, which is the text that the LLM should "search" for in an answer, a technique that is called prompt engineering. The main problem with this approach is that the size of the prompt is limited. For example, the limit for GPT3.5-Turbo is 4,096 tokens, the limit for GPT4 is 8,192 tokens, and the limit for GPT-4-32k is 32,768 tokens. Documents or other content that can be searched using the LLM are often orders of magnitude larger than the prompt size limit. For example, the size of a single example storage system user guide is twenty megabytes, and the size of the complete set of relevant installation documents and knowledge base articles ranges between hundreds of megabytes to hundreds of gigabytes. Accordingly, Retrieval Augmented Generation (RAG) is used to break input documents into chunks that are small enough to fit the prompt size limitations. It then uses common indexing and retrieval techniques to match user queries to the most relevant content chunks, and then combines the user query and context (one or more chunks) as a prompt to the LLM and presents the answers to the user.

Conventional approaches chunk input documents successively, taking each time as many characters as possible without exceeding the prompt size limitations. This approach seeks to find the best answer for a given query, based on a single chunk (i.e., the one best matching the query). However, this does not address the case when there are multiple potential answers for a query, originating from different text chunks and, possibly, from different documents.

SUMMARY OF DISCLOSURE

In one example implementation, a computer-implemented method executed on a computing device may include, but is not limited to, generating a plurality of chunks for a plurality of text portions of a document. A plurality of chunk embeddings are generated from the plurality of chunks. A query is processed using a generative artificial intelligence (AI) model. A query embedding is generated from the query. A plurality of candidate chunk embeddings are identified from the plurality of chunk embeddings based upon, at least in part, a chunk size and a chunk similarity score associated with each chunk and a performance metric associated with the query. A prompt is generated using the query embedding and the plurality of candidate chunk embeddings. The prompt is provided to the generative AI model.

One or more of the following example features may be included. The query may be processed during Retrieval Augmented Generation (RAG) using the generative AI model. Identifying the plurality of candidate chunk embeddings may include determining the chunk size and the chunk similarity score associated with each chunk. Identifying the plurality of candidate chunk embeddings may include determining a candidate chunk performance value for each chunk by dividing the chunk similarity score by the chunk size for each chunk. Identifying the plurality of candidate chunk embeddings may include ranking the plurality of chunk embeddings based upon, at least in part, the candidate chunk value for each chunk. Identifying the plurality of candidate chunk embeddings may include adding chunk embeddings to the plurality of chunk embeddings with the highest candidate chunk values using the ranking of the plurality of chunk embeddings. Adding chunk embeddings to the plurality of chunk embeddings may include adding further candidate chunk embeddings to the plurality of chunk embeddings until one of: the performance metric associated with the query is reached and a total candidate chunk performance value is not increased with additional chunk embeddings.

In another example implementation, a computer program product resides on a computer readable medium that has a plurality of instructions stored on it. When executed by a processor, the instructions cause the processor to perform operations that may include, but are not limited to, generating a plurality of chunks for a plurality of text portions of a document. A plurality of chunk embeddings are generated from the plurality of chunks. A query is processed using a generative artificial intelligence (AI) model. A query embedding is generated from the query. A plurality of candidate chunk embeddings are identified from the plurality of chunk embeddings based upon, at least in part, a chunk size and a chunk similarity score associated with each chunk and a performance metric associated with the query. A prompt is generated using the query embedding and the plurality of candidate chunk embeddings. The prompt is provided to the generative AI model.

One or more of the following example features may be included. The query may be processed during Retrieval Augmented Generation (RAG) using the generative AI model. Identifying the plurality of candidate chunk embeddings may include determining the chunk size and the chunk similarity score associated with each chunk. Identifying the plurality of candidate chunk embeddings may include determining a candidate chunk performance value for each chunk by dividing the chunk similarity score by the chunk size for each chunk. Identifying the plurality of candidate chunk embeddings may include ranking the plurality of chunk embeddings based upon, at least in part, the candidate chunk value for each chunk. Identifying the plurality of candidate chunk embeddings may include adding chunk embeddings to the plurality of chunk embeddings with the highest candidate chunk values using the ranking of the plurality of chunk embeddings. Adding chunk embeddings to the plurality of chunk embeddings may include adding further candidate chunk embeddings to the plurality of chunk embeddings until one of: the performance metric associated with the query is reached and a total candidate chunk performance value is not increased with additional chunk embeddings.

In another example implementation, a computing system includes at least one processor and at least one memory architecture coupled with the at least one processor, wherein the at least one processor is configured to generate a plurality of chunks for a plurality of text portions of a document. A plurality of chunk embeddings are generated from the plurality of chunks. A query is processed using a generative artificial intelligence (AI) model. A query embedding is generated from the query. A plurality of candidate chunk embeddings are identified from the plurality of chunk embeddings based upon, at least in part, a chunk size and a chunk similarity score associated with each chunk and a performance metric associated with the query. A prompt is generated using the query embedding and the plurality of candidate chunk embeddings. The prompt is provided to the generative AI model.

One or more of the following example features may be included. The query may be processed during Retrieval Augmented Generation (RAG) using the generative AI model. Identifying the plurality of candidate chunk embeddings may include determining the chunk size and the chunk similarity score associated with each chunk. Identifying the plurality of candidate chunk embeddings may include determining a candidate chunk performance value for each chunk by dividing the chunk similarity score by the chunk size for each chunk. Identifying the plurality of candidate chunk embeddings may include ranking the plurality of chunk embeddings based upon, at least in part, the candidate chunk value for each chunk. Identifying the plurality of candidate chunk embeddings may include adding chunk embeddings to the plurality of chunk embeddings with the highest candidate chunk values using the ranking of the plurality of chunk embeddings. Adding chunk embeddings to the plurality of chunk embeddings may include adding further candidate chunk embeddings to the plurality of chunk embeddings until one of: the performance metric associated with the query is reached and a total candidate chunk performance value is not increased with additional chunk embeddings.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 3 is an example flowchart of content selection process according to one or more example implementations of the disclosure;

FIG. 4 is an example document according to one or more example implementations of the disclosure;

Like reference symbols in the various drawings indicate like elements.

DETAILED DESCRIPTION

Figure 1:
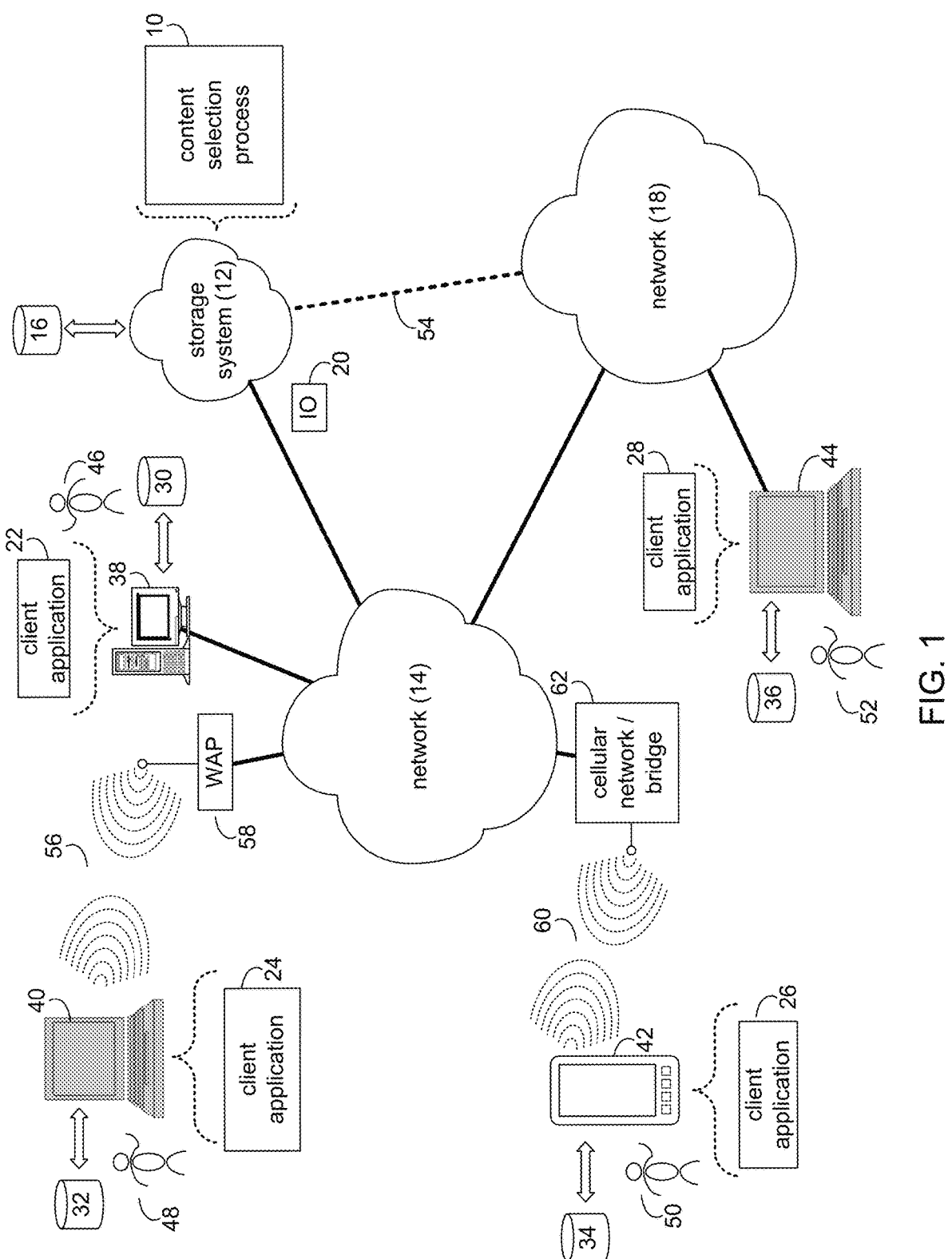
FIG. 1 is an example diagrammatic view of a storage system and a content selection process coupled to a distributed computing network according to one or more example implementations of the disclosure.

System Overview:

Referring to FIG. 1, there is shown content selection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device, and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries, or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of content selection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of content selection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries, or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a content selection process, such as content selection process 10 of FIG. 1, may include but is not limited to, generating a plurality of chunks for a plurality of text portions of a document. A plurality of chunk embeddings are generated from the plurality of chunks. A query is processed using a generative artificial intelligence (AI) model. A query embedding is generated from the query. A plurality of candidate chunk embeddings are identified from the plurality of chunk embeddings based upon, at least in part, a chunk size and a chunk similarity score associated with each chunk and a performance metric associated with the query. A prompt is generated using the query embedding and the plurality of candidate chunk embeddings. The prompt is provided to the generative AI model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
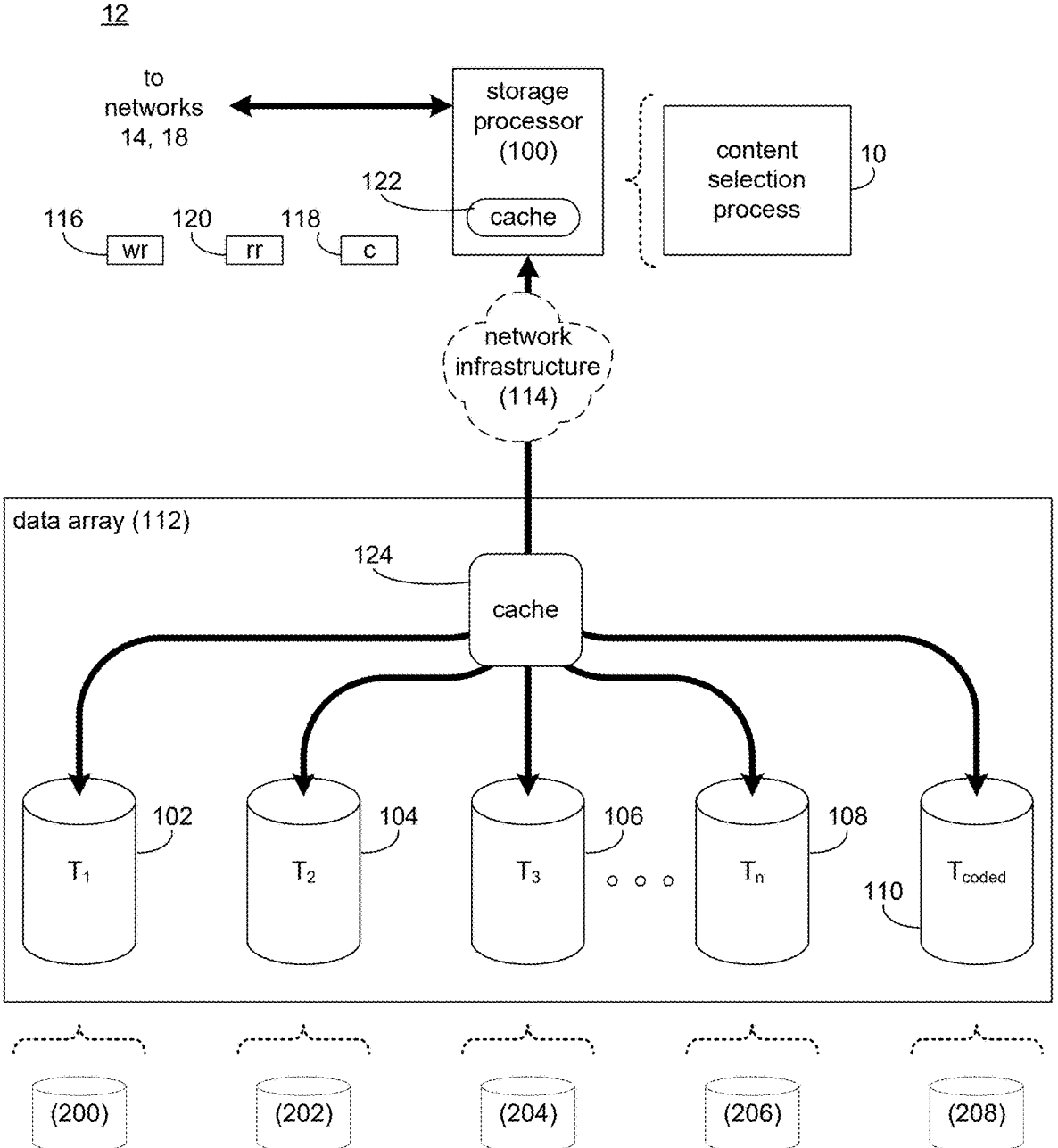
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106,

108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/ performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/ performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of content selection process 10. The instruction sets and subroutines of content selection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of content selection process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of content selection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of content selection process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Content Selection Process:

Referring also to the examples of FIGS. 3-7 and in some implementations, content selection process 10 may generate 300 a plurality of chunks for a plurality of text portions of a document. A plurality of chunk embeddings are generated 302 from the plurality of chunks. A query is processed 304 using a generative artificial intelligence (AI) model. A query embedding is generated 306 from the query. A plurality of candidate chunk embeddings are identified 308 from the plurality of chunk embeddings based upon, at least in part, a chunk size and a chunk similarity score associated with each chunk and a performance metric associated with the query. A prompt is generated 310 using the query embedding and the plurality of candidate chunk embeddings. The prompt is provided 312 to the generative AI model.

As will be discussed in greater detail below, implementations of the present disclosure may allow for multiple chunks to be selected for prompt generating using the similarity and size of each chunk to determine which chunks, if added to a prompt, will enhance the results. As discussed above, conventional methods are helpful with finding the best answer for a given query, based on a single chunk (i.e., the one best matching the query). However, this does not address the case when there are multiple potential answers for a query, originating from different text chunks (possibly from different documents). Implementations of the present disclosure allow for the selection of chunks to provide to the LLM, so that the total context size does not exceed a certain "budget", such as the prompt size limit or a lower constraint set by the system or the user, and the aggregated value to the user from the multiple answers provided is maximized.

Referring to the example document shown in FIG. 4, consider a user guide titled "Dell PowerStore Protecting Your Data" (e.g., document 400) and a user query "How to perform disaster recovery?". There are multiple disjoint (and sometimes overlapping) potential answers in the source document. For example, a user can plan for disaster recovery using replication, or using SRM (a VMware® disaster recovery solution), and by creating a protection group on vSphere® that includes one or more replication groups and a recovery plan (e.g., a part of the SRM configuration). This provides the user with multiple answers covering different scenarios or use cases. The present disclosure addresses the challenge of selecting the best document portions or chunks by allowing the user to get the maximal value from a query when there are multiple potential matches, for a given "budget", (e.g., in order to not exceed the prompt size limitations), by using chunk weight and score (with respect to a given query) to select the most suitable set of chunks to be provided to the LLM, and by optimizing the chunk selection under different assumptions (i.e., maximizing total value and maximizing ROI). As shown in FIG. 4, a document (e.g., document 400) may include a plurality of text portions (e.g., text portions 402, 404, 406, 408) that may provide a basis for answering a user query.

Figure 5:
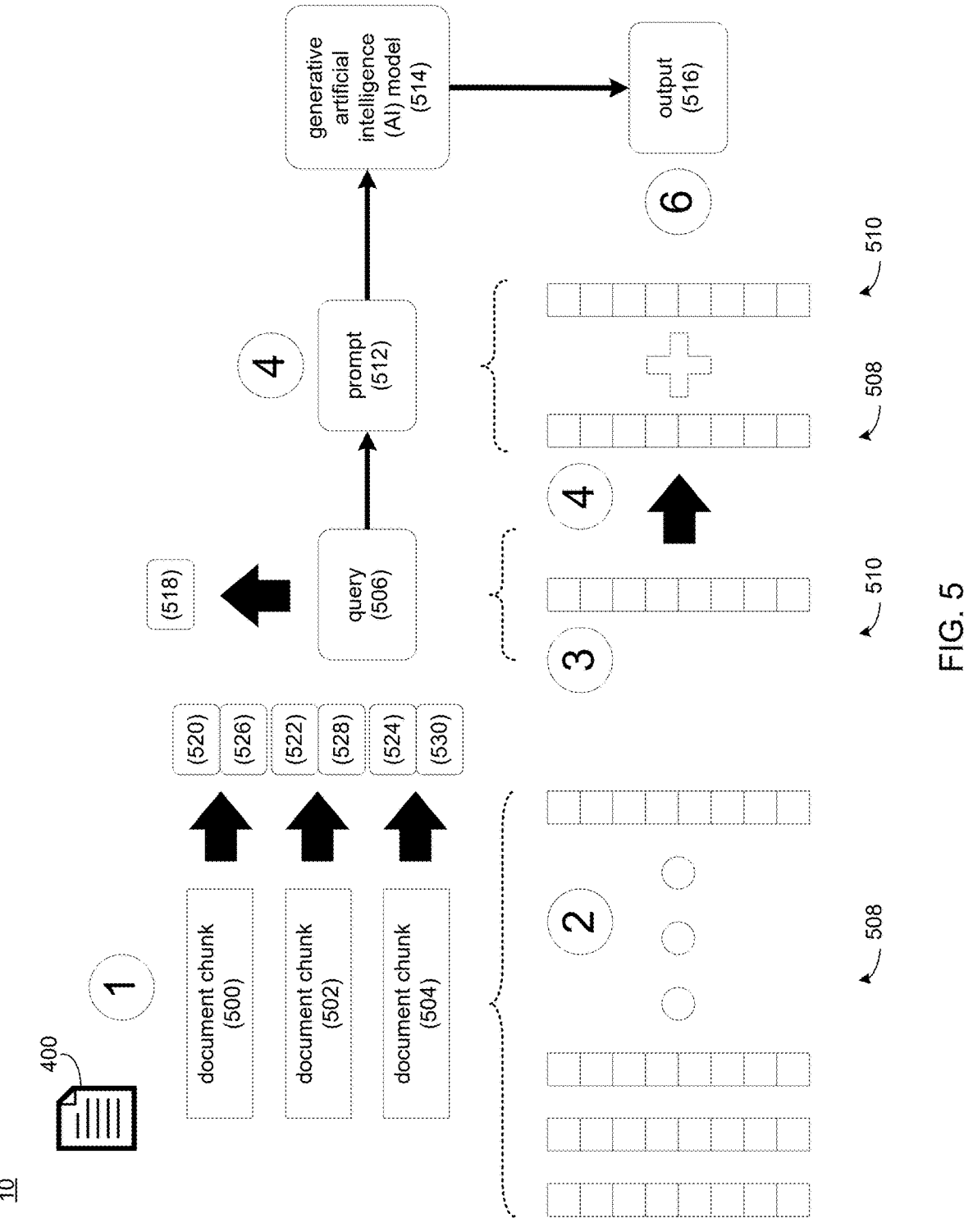
FIG. 5 is an example diagrammatic view of a retrieval augmented generation (RAG) process according to one or more example implementations of the disclosure.
Figure 6:
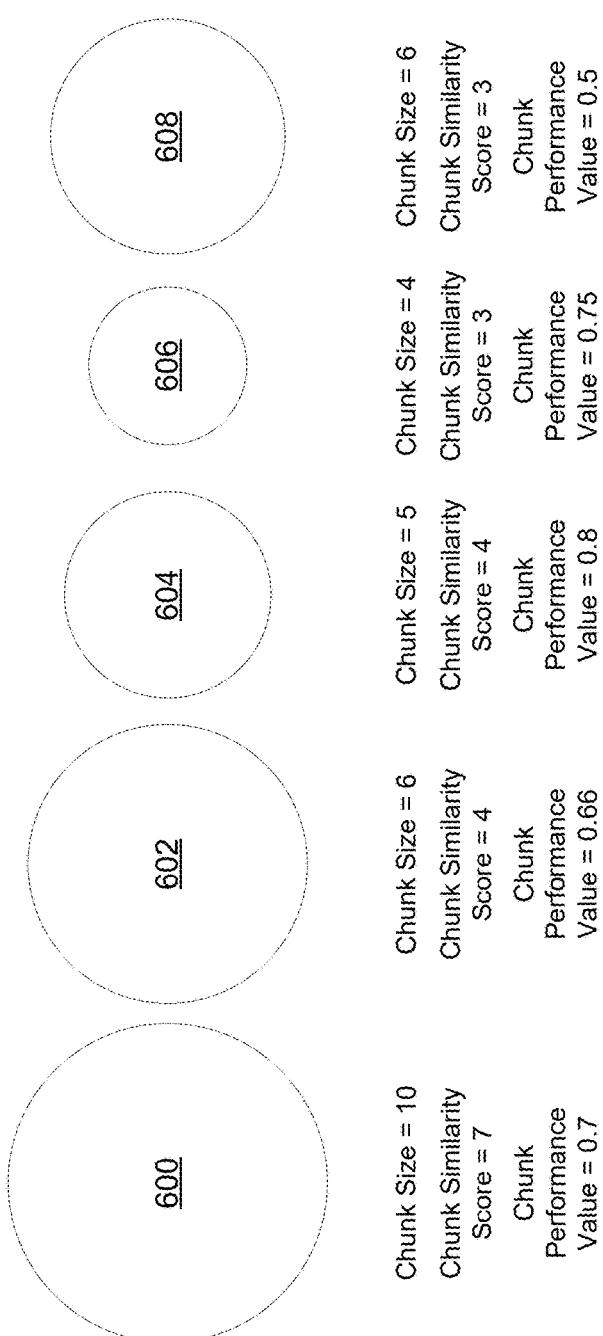
FIG. 6 is an example diagrammatic view of the ranking of chunk embeddings according to various example implementations of the disclosure.

Referring also to FIG. 5 and as will be discussed in greater detail below, content selection process 10 provides a plurality of respective chunks for use during retrieval augmented generation (RAG). As shown in FIG. 5 and when preparing an input document for retrieval augmented generation (RAG), content selection process 10 processes a collection of input documents (e.g., document 400) and breaking each input document into chunks (e.g., document chunks 500, 502, 504). This is shown as action "1".

Content selection process 10 indexes each chunk using word embeddings. For example, the Bidirectional Encoder Representations from Transformers (BERT) sentence transformer uses a space of 384 embeddings. In this example, each chunk of text is passed through the transformer, and a vector of 384 numbers corresponding to the 384 dimensions is outputted. The resulting content chunks and their vector embeddings (e.g., word embeddings 508) are stored in a database. This is shown as action "2" which completes the preprocessing of input documents for use during RAG.

Given a user query (e.g., query 506), the query text is likewise transformed into a vector of embeddings (e.g., query embedding 510). This is shown as action "3". The similarity between the query and chunks is determined to find a small set of chunks that are most similar (i.e., relevant) to the query. This is done using cosine similarity or a similar algorithm. As will be described in greater detail below, this matching step can be done efficiently using vector search. This is shown as action "4".

The query and selected chunks are combined into a prompt (e.g., prompt 512) to the LLM (e.g., generative artificial intelligence (AI) model 514). This is shown as action "5". In some implementations, a generative AI model (e.g., generative AI model 514) is a type of artificial intelligence system that is capable of generating new data samples that are similar to the training data it has been trained with. These models generally work by learning the underlying patterns and structures present in the training data and then using this "knowledge", they generate new, consistent examples. In some implementations, the generative AI model includes a Large Language Model (LLM). A LLM (e.g., GPT-4 from OpenAI®, OpenLLaMa, and Cerebras-GPT) is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In some implementations, the generative AI model includes a natural language processing (NLP) model. An NLP model (e.g., XLNet, Robustly Optimized Bidirectional Encoder Representations from Transformers Pretraining Approach (RoBERTa), and Pathways Language Model (PaLM)) is a model that concerns the understanding, analysis, and generation of natural language. NLP models analyze text and speech to extract meaning, as well as generating new text or speech in response.

Many generative AI models, such as LLMs, are not trained on a particular library of input documents used for a particular scenario. As such, these generative AI models lack the context to process content from the particular library of input documents. Accordingly, the process of Retrieval Augmented Generation (RAG) is used to break the relevant input documents into chunks that are small enough to fit prompt size limitations associated with the generative AI model. Content selection process 10 uses common indexing and retrieval techniques to match user queries to the most relevant content chunks, and then combines the user query and context (one or more chunks) as a prompt to the generative AI model and presents the answer(s) to the user.

Returning to the example of FIG. 5, the LLM output (e.g., output 516) is presented to the user. This is shown as action "6". Accordingly, content selection process 10 enhances the preprocessing of input documents by generating chunks and respective word embeddings. However, as noted above, conventional approaches do not address the case when there are multiple potential answers for a query, originating from different text chunks and, possibly, from different documents.

In some implementations, content selection process 10 generates 300 a plurality of chunks for a plurality of text portions of a document. For example and referring again to FIG. 4, a document (e.g., document 400) includes text portions (e.g., text portions 402, 404, 406, 408). In some implementations, content selection process 10 generates a plurality of chunks from the plurality of text portions (e.g., text portions 402, 404, 406, 408) of document 500. A chunk is a discrete portion of the document that is used to generate a word embedding for combination with a query embedding to provide content in a prompt provided to a generative AI model during RAG. Generating 300 the plurality of chunks includes generating an index or indexes for searching during query processing. As such, each generated chunk may be stored in a database or other data structure as an index. In this example, content selection process 10 generates 300 chunk 500 for text portion 402; chunk 502 for text portion 404; and chunk 504 for text portion 408. While an example of a single document (e.g., document 400) is described, it will be appreciated that content selection process 10 may generate a plurality of chunks for a plurality of documents within the scope of the present disclosure.

In some implementations, content selection process 10 generates 302 a plurality of chunk embeddings from the plurality of chunks. For example, content selection process 10 indexes 302 each chunk using a word embedding. Referring again to FIG. 5, content selection process 10 generates 300 a plurality of chunks as described above (e.g., document chunks 500, 502, 504) from document 500. Accordingly, content selection process 10 indexes the plurality of respective chunks (e.g., document chunks 500, 502, 504) into a plurality of word embeddings (e.g., word embeddings 508) by converting each document chunk into a vector of embeddings. In some implementations, indexing each chunk into a word embedding includes passing each chunk of content (i.e., text) through a transformer, and a vector of numbers corresponding to the dimensions for the vector embedding is outputted. The resulting content chunks and their vector embeddings (e.g., word embeddings 508) are stored in a database.

In some implementations, content selection process 10 processes 304 a query using a generative artificial intelligence (AI) model. As discussed above, a query (e.g., query 506) is a request from a user for information from a document or a plurality of documents. In one example, query 506 may include a text string in the form of a request or a question. In another example, query 506 may be initially received as a recorded audio request from a user that is converted into a machine-readable version of the audio signal and/or converted to text (e.g., using an automated speech recognition system). In some implementations, content selection process 10 processes 314 the query during Retrieval Augmented Generation (RAG) using the generative AI model. For example and as discussed above, RAG is a process used to break relevant input documents into chunks that are small enough to fit prompt size limitations associated with a generative AI model for processing queries upon.

In some implementations, content selection process 10 generates 306 a query embedding from the query. For example, given a user query (e.g., query 506), the query text is transformed into a vector of embeddings (e.g., query embedding 510) by passing each query 506 through a transformer to generate a vector of numbers corresponding to the dimensions for the vector embedding (e.g., query embedding 510). The transformer may include any language model or word embedding model that converts text into a numerical representation. In some implementations, query embedding 510 is a numerical representation of the semantic meaning of query 506 and allows query 506 to be understood and processed more effectively when comparing against chunk embeddings of document 400.

In some implementations, content selection process 10 identifies 308 a plurality of candidate chunk embeddings from the plurality of chunk embeddings based upon, at least in part, a chunk size and a chunk similarity score associated with each chunk and a performance metric associated with the query. A chunk size is the length or size of the chunk. This can also be expressed as a number of tokens or an amount of memory consumed to store the chunk. A chunk similarity score is a numerical representation of the similarity between a chunk embedding and a query embedding. For example, content selection process 10 determines or generates a chunk similarity score to each candidate chunk based on of how well it matches a given query. The score is based on the similarity, or distance, between the vector embeddings of the chunk and query. It will be appreciated that any distance metric can be used within the scope of the present disclosure. In one example, content selection process 10 determines the chunk similarity score using cosine similarity. Cosine similarity scoring assigns a score in the range of $[-1,1]$, where a score close to "1" means the two vectors are similar (codirectional), a score close to "−1" means the two vectors are opposite, and a score close to "0" means the two vectors are unrelated (orthogonal). In some implementations, content selection process 10 limits the score to the range of $[0,1]$ and ignore chunks that have a negative cosine similarity with the query.

In some implementations, a performance metric associated with the query 506 is a limitation or threshold specific to the query that determines the number of chunks to be selected for generating the prompt along with the query. For example, the performance metric (e.g., performance metric 518) may be the prompt limit (i.e., the maximum number of tokens for the prompt). In another example, the performance metric may be a lower limit set by content selection process 10 or the user which defines a "budget". For example, larger prompts incur a higher cost. The time to generate an answer using LLM decoding is proportional to the prompt size. Also, commercial generative AI models may incur a fee based on the prompt size. For example, the LLM, ChatGPT 3.5, can incur a fee of $0.002 per 1,000 tokens. Accordingly, content selection process 10 may receive a user-defined performance metric associated with query 506 and/or may use a default performance metric to limit the number of chunks selected for generating the prompt.

In some implementations, identifying 308 the plurality of candidate chunk embeddings includes determining 316 the chunk size and the chunk similarity score associated with each chunk. For example, content selection process 10 determines the chunk size for each chunk (e.g., chunks 502, 504, 506) in terms of tokens (e.g., chunk sizes 520, 522, 524)

and the chunk similarity score (e.g., chunk similarity scores 526, 528, 530) by comparing chunks 502, 504, 506 to query 506 as a value between "0" and "1" where the closer the score is to "1", the greater the similarity between the given chunk embedding and query embedding 510 and the closer the score is to "0", the lower the similarity between the given chunk embedding and query embedding 510.

In some implementations, identifying 308 the plurality of candidate chunk embeddings includes determining 318 a candidate chunk performance value for each chunk by dividing the chunk similarity score by the chunk size for each chunk. In one example, the chunk performance value is a ratio between the candidate chunk performance value and the chunk weight. For example, content selection process 10 provides the user with a most similar chunk (in terms of the chunk similarity score) and investing additional budget only if it is "worth it" where the chunk's value or ROI (return on investment) is defined as the ratio between its chunk similarity score and its chunk size.

In some implementations, identifying 308 the plurality of candidate chunk embeddings includes ranking 320 the plurality of chunk embeddings based upon, at least in part, the candidate chunk value for each chunk. For a given query and assuming that candidate chunks are disjoint and non-overlapping, content selection process 10 maps to a knapsack formulation by regarding chunk size (in bytes or tokens) as item weight and the chunk score (as a similarity with respect to a given query) as its value. Accordingly, content selection process 10 ranks 320 the plurality of chunk embeddings using the candidate chunk value beginning with the most similar chunk (i.e., the chunk that has the highest similarity score regardless of its candidate chunk value). Consider the example of FIG. 6 with chunks 600, 602, 604, 606, 608. In this example, content selection process 10 determines 316 a chunk size of 10 for chunk 600; a chunk size of 6 for chunk 602; a chunk size of 5 for chunk 604; a chunk size of 4 for chunk 606; and a chunk size of 6 for chunk 608. Further, content selection process 10 determines a chunk similarity score of 7 for chunk 600; a chunk similarity score of 4 for chunk 602; a chunk similarity score of 4 for chunk 604; a chunk similarity score of 3 for chunk 606; and a chunk similarity score of 3 for chunk 608. With these chunk sizes and similarity scores, content selection process 10 determines 316 a candidate chunk performance value of 0.7 for chunk 500; a candidate chunk performance value of 0.66 for chunk 502; a candidate chunk performance value of 0.8 for chunk 504; a candidate chunk performance value of 0.77 for chunk 506; and a candidate chunk performance value of 0.5 for chunk 508. In this example, content selection process 10 ranks 320 chunks 600, 602, 604, 606, 608 as shown below in Table 1:

TABLE 1

| Chunk | Chunk Similarity Score | Chunk Size | Candidate Chunk Value |
|-------|------------------------|------------|-----------------------|
| 600 | 7 | 10 | 0.7 |
| 604 | 4 | 5 | 0.8 |
| 606 | 4 | 3 | 0.75 |
| 602 | 4 | 6 | 0.66 |
| 608 | 6 | 3 | 0.5 |

As shown above, chunk 600 is the first chunk selected because it has the highest chunk similarity score despite having a lower candidate chunk value than chunk 604. In this example, the following chunks (i.e., chunks 602, 604, 606, 608) are ranked according to their candidate chunk values.

Figure 7:
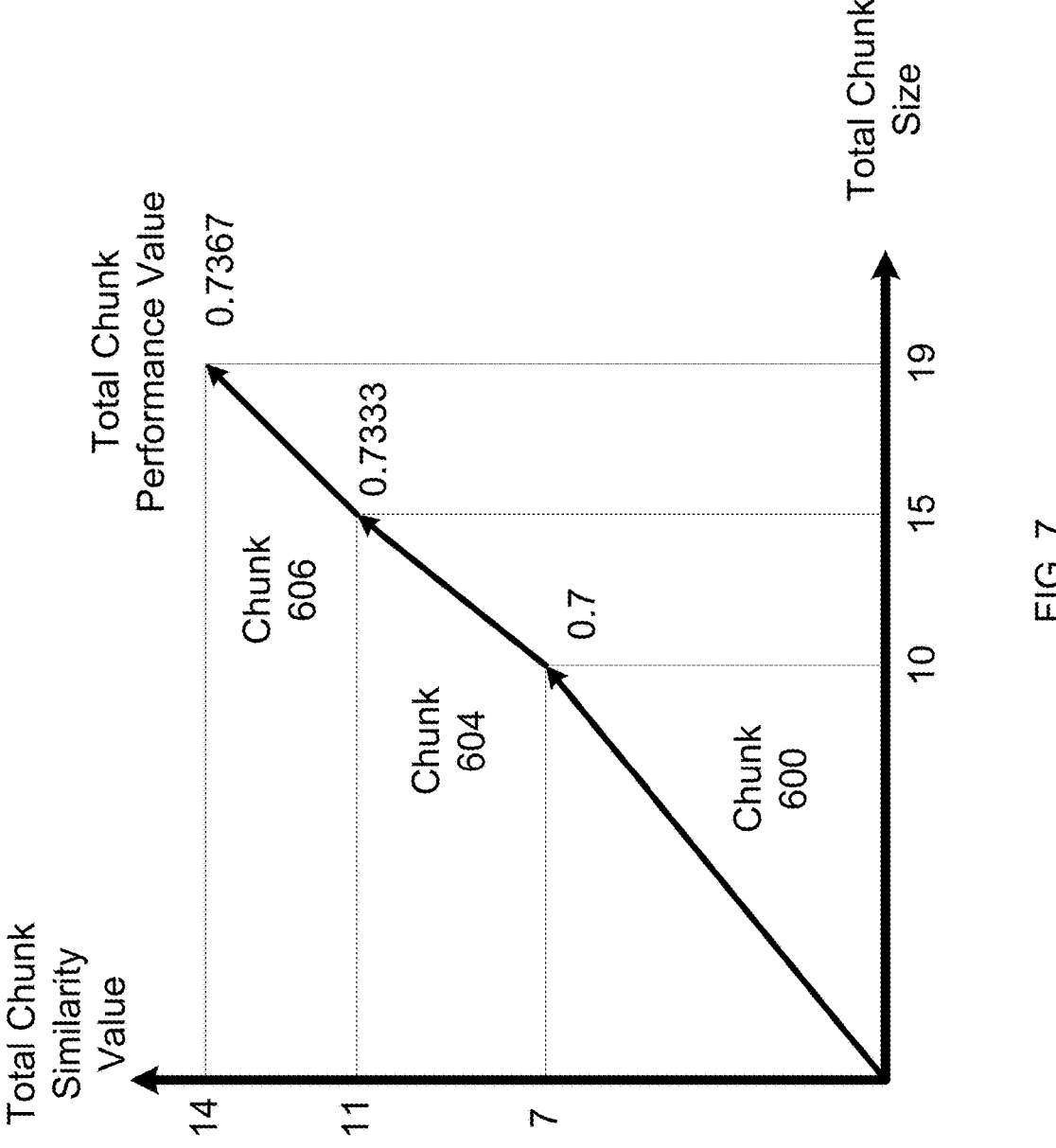
FIG. 7 is an example diagrammatic view of the selection of candidate chunk embeddings based on chunk sizes and chunk similarity scores according to one or more example implementations of the disclosure.

In some implementations, identifying 308 the plurality of candidate chunk embeddings includes adding 322 chunk embeddings to the plurality of candidate chunk embeddings with the highest candidate chunk values using the ranking of the plurality of chunk embeddings. Referring also to FIG. 7 and continuing the above example, content selection process 10 adds 322 chunk embeddings to the plurality of candidate chunk embeddings (i.e., the chunk embeddings to be used to form a prompt to generative AI model 514) by selecting the most similar (highest score) chunk first, and then adding additional chunks only if their candidate chunk value improves the current total candidate chunk value (of the items selected so far), or alternatively is within a certain margin of this candidate chunk value. With the ranking from Table 1 above, content selection process 10 adds chunk 600 first since it has the highest similarity score, 7. This brings the total candidate chunk value to 0.7.

In some implementations, adding 322 chunk embeddings to the plurality of chunk embeddings includes adding 324 further candidate chunk embeddings to the plurality of chunk embeddings until one of the performance metric associated with the query is reached and a total candidate chunk performance value is not increased with additional chunk embeddings. Continuing with the above example, content selection process 10 adds chunk 604 which has the highest candidate chunk performance value of the remaining (candidate) chunks, 0.8. Combining the chunk sizes and similarity scores of chunk 600 and chunk 604 yields an aggregated total chunk performance value of 0.7333. In this example, content selection process 10 determines whether the performance metric associated with the query is reached. If not, content selection process 10 adds another chunk which, when added, increases the total chunk performance value. In this example, chunk 606 is the only remaining candidate chunk with a higher candidate chunk performance value so it is added next. This brings the total chunk performance value to 0.7367. In this example and assuming that the performance metric associated with the query is not reached, no other chunks will be added as the total candidate chunk performance value is not increased with additional chunk embeddings.

Referring again to the above example where query 506 is "How to perform disaster recovery?" Suppose content selection process 10 ranks 320 chunks 500, 502, 504 and other chunks as shown in Table 2 below. In this example, the answer provided to the user combines information from two different chunks (chunk 500, the best and therefore first answer, and chunk 504, which had the best overall candidate chunk value), while ignoring the other four chunks.

TABLE 2

| Chunk | Chunk Value | Chunk Size (token count) | Candidate Chunk Value | Included in answer? |
|---|---|---|---|---|
| 500 | 0.83 | 399 | 0.0028 | Y |
| 36 | 0.817 | 280 | 0.002918 | N |
| 502 | 0.814 | 800 | 0.001018 | N |
| 3 | 0.811 | 527 | 0.001539 | N |
| 504 | 0.81 | 139 | 0.005827 | Y |
| 93 | 0.809 | 304 | 0.002661 | N |

In some implementations, content selection process 10 generates 310 a prompt using the query embedding and the plurality of candidate chunk embeddings. Continuing with the above example, content selection process 10 generates prompt 512 using chunks 500 and 504.

In some implementations, content selection process 10 provides 312 the prompt to the generative AI model. Generative AI model 514 processes prompt 512 to generate an output (e.g., output 518). Continuing with the above example, the output (e.g., output 516) generated by generative AI model 514 is formed from chunks 500 and 504:

"Using Replication for Disaster Recovery:
  Minimizes potential data loss based on the Recovery Point Objective (RPO) setting in the associated replication rule.
  Data access can be restored by failing over to the destination system.
  Ensure the storage resource has the correct access permissions to the host and share.
  To resume operations on the source system, select the Reprotect option on the destination system.
Virtual Machine Recovery:
  Configure a recovery plan using Site Recovery Manager (SRM).
  Create a protection group on vSphere that includes one or more replication groups and a recovery plan.
  Monitor the replication session status during recovery."
General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods, and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

generating a plurality of chunks for a plurality of text portions of a document;

generating a plurality of chunk embeddings from the plurality of chunks;

processing a query using a generative artificial intelligence (AI) model;

generating a query embedding from the query;

identifying a plurality of candidate chunk embeddings from the plurality of chunk embeddings based upon, at least in part, a chunk size, a chunk similarity score associated with each chunk, and a performance metric associated with the query, wherein the performance metric associated with the query is a user-defined prompt size limitation associated with the query that is different than a maximum number of tokens for a prompt, wherein identifying the plurality of candidate chunk embeddings includes:

determining the chunk size and the chunk similarity score associated with each chunk, and determining a candidate chunk performance value for each chunk by dividing the chunk similarity score by the chunk size for each chunk;

generating the prompt using the query embedding and the plurality of candidate chunk embeddings; and providing the prompt to the generative AI model.

2. The computer-implemented method of claim 1, further comprising:

processing the query during Retrieval Augmented Generation (RAG) using the generative AI model.

3. The computer-implemented method of claim 1, wherein identifying the plurality of candidate chunk embeddings includes ranking the plurality of chunk embeddings based upon, at least in part, the candidate chunk value for each chunk.

4. The computer-implemented method of claim 3, wherein identifying the plurality of candidate chunk embeddings includes adding chunk embeddings to the plurality of chunk embeddings with the highest candidate chunk values using the ranking of the plurality of chunk embeddings.

5. The computer-implemented method of claim 4, wherein adding chunk embeddings to the plurality of chunk embeddings includes adding further candidate chunk embeddings to the plurality of chunk embeddings until one of: the performance metric associated with the query is reached and a total candidate chunk performance value is not increased with additional chunk embeddings.

6. A computer program product residing on a non-transitory computer readable medium having a plurality of instructions stored thereon which, when executed by a processor, cause the processor to perform operations comprising:

generating a plurality of chunks for a plurality of text portions of a document;

generating a plurality of chunk embeddings from the plurality of chunks;

processing a query using a generative artificial intelligence (AI) model;

generating a query embedding from the query;

identifying a plurality of candidate chunk embeddings from the plurality of chunk embeddings based upon, at least in part, a chunk size, a chunk similarity score associated with each chunk, and a performance metric associated with the query, wherein the performance metric associated with the query is a user-defined prompt size limitation associated with the query that is different than a maximum number of tokens for a prompt, wherein identifying the plurality of candidate chunk embeddings includes:

determining the chunk size and the chunk similarity score associated with each chunk, and determining a candidate chunk performance value for each chunk by dividing the chunk similarity score by the chunk size for each chunk;

generating the prompt using the query embedding and the plurality of candidate chunk embeddings; and providing the prompt to the generative AI model.

7. The computer program product of claim 6, wherein the operations further comprise:

processing the query during Retrieval Augmented Generation (RAG) using the generative AI model.

8. The computer program product of claim 6, wherein identifying the plurality of candidate chunk embeddings includes ranking the plurality of chunk embeddings based upon, at least in part, the candidate chunk value for each chunk.

9. The computer program product of claim 8, wherein identifying the plurality of candidate chunk embeddings includes adding chunk embeddings to the plurality of chunk embeddings with the highest candidate chunk values using the ranking of the plurality of chunk embeddings.

10. The computer program product of claim 9, wherein adding chunk embeddings to the plurality of chunk embeddings includes adding further candidate chunk embeddings to the plurality of chunk embeddings until one of: the performance metric associated with the query is reached and a total candidate chunk performance value is not increased with additional chunk embeddings.

11. A computing system comprising:

a memory; and a processor configured to:

generate a plurality of chunks for a plurality of text portions of a document, generate a plurality of chunk embeddings from the plurality of chunks, to process a query using a generative artificial intelligence (AI) model, generate a query embedding from the query, identify a plurality of candidate chunk embeddings from the plurality of chunk embeddings based upon, at least in part, a chunk size, a chunk similarity score associated with each chunk, and a performance metric associated with the query, wherein the performance metric associated with the query is a user-defined prompt size limitation associated with the query that is different than a maximum number of tokens for a prompt, wherein identifying the plurality of candidate chunk embeddings includes:

determining the chunk size and the chunk similarity score associated with each chunk, and determining a candidate chunk performance value for each chunk by dividing the chunk similarity score by the chunk size for each chunk, generate the prompt using the query embedding and the plurality of candidate chunk embeddings, and provide the prompt to the generative AI model.

12. The computing system of claim 11, wherein the processor is further configured to:

process the query during Retrieval Augmented Generation (RAG) using the generative AI model.

13. The computing system of claim 11, wherein identifying the plurality of candidate chunk embeddings includes ranking the plurality of chunk embeddings based upon, at least in part, the candidate chunk value for each chunk.

14. The computing system of claim 13, wherein identifying the plurality of candidate chunk embeddings includes adding chunk embeddings to the plurality of chunk embeddings with the highest candidate chunk values using the ranking of the plurality of chunk embeddings.

\* \* \* \* \*